United States Patent
Walley et al.

(10) Patent No.: US 9,872,324 B2
(45) Date of Patent: Jan. 16, 2018

(54) MESH NETWORK CONNECTIONS

(71) Applicant: BROADCOM CORPORATION, Irvine, CA (US)

(72) Inventors: John Stuart Walley, Ladera Ranch, CA (US); Thomas J. Quigley, Franklin, NC (US); Alexander G. MacInnis, Los Altos, CA (US); Arya Behzad, Los Altos, CA (US); Jeyhan Karaoguz, Irvine, CA (US); Mark L. Buer, Payson, AZ (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 14/952,868

(22) Filed: Nov. 25, 2015

(65) Prior Publication Data

US 2016/0081131 A1    Mar. 17, 2016

Related U.S. Application Data

(63) Continuation of application No. 13/625,322, filed on Sep. 24, 2012, now Pat. No. 9,237,600, which is a continuation of application No. 11/864,339, filed on Sep. 28, 2007, now Pat. No. 8,274,957.

(60) Provisional application No. 60/950,959, filed on Jul. 20, 2007.

(51) Int. Cl.
| | | |
|---|---|---|
| H04L 12/28 | (2006.01) | |
| H04W 76/02 | (2009.01) | |
| H04W 84/18 | (2009.01) | |
| H04W 76/00 | (2009.01) | |
| H04W 84/12 | (2009.01) | |

(52) U.S. Cl.
CPC ......... *H04W 76/023* (2013.01); *H04W 84/18* (2013.01); *H04W 76/00* (2013.01); *H04W 84/12* (2013.01)

(58) Field of Classification Search
None
See application file for complete search history.

(56) References Cited

U.S. PATENT DOCUMENTS

| | | |
|---|---|---|
| 6,275,500 B1 | 8/2001 | Callaway, Jr. et al. |
| 6,631,116 B1 | 10/2003 | Eneroth et al. |
| 7,359,674 B2 | 4/2008 | Markki et al. |
| 7,386,275 B2 | 6/2008 | Pirzada et al. |
| 7,613,564 B2 | 11/2009 | Vorona |

(Continued)

*Primary Examiner* — Phirin Sam
(74) *Attorney, Agent, or Firm* — McDermott Will & Emery LLP (57) ABSTRACT

Wireless mobile communication (WMC) devices located in near proximity of each other may be enabled to form a mesh (ad hoc wireless) network. WMC devices may form and/or tear down intra-mesh connection with other WMC devices in the same mesh network. WMC devices may utilize information related to other WMC devices in the mesh network in determining formation and tearing down of intra-mesh connections. This information may comprise relative speeds, locations, and directions of movement of the WMC devices forming/tearing intra-mesh connections. Other information including data bandwidth and/or power consumption may be utilized in such determination. This information may also comprise available services advertised by WMC devices in the mesh network.

20 Claims, 7 Drawing Sheets

(56) References Cited

U.S. PATENT DOCUMENTS

| | | |
|---|---|---|
| 7,739,402 B2 | 6/2010 | Roese et al. |
| 8,274,957 B2 | 9/2012 | Walley et al. |
| 8,295,819 B1* | 10/2012 | Kaplan ............. H04M 3/42042 |
| | | 379/88.19 |
| 8,461,958 B2* | 6/2013 | Saenz ................... H04W 4/046 |
| | | 340/3.1 |
| 9,451,630 B2* | 9/2016 | Chen .................. H04W 72/1215 |
| 2001/0024953 A1* | 9/2001 | Balogh ................... H04L 45/00 |
| | | 455/432.1 |
| 2002/0137472 A1* | 9/2002 | Quinn .................... H04B 1/005 |
| | | 455/553.1 |
| 2003/0014367 A1 | 1/2003 | Tubinis |
| 2003/0185233 A1 | 10/2003 | Ji et al. |
| 2004/0142711 A1* | 7/2004 | Mahonen .......... H04M 1/72527 |
| | | 455/502 |
| 2004/0162022 A1 | 8/2004 | Lahetkangas et al. |
| 2004/0190718 A1 | 9/2004 | Dacosta |
| 2005/0213555 A1 | 9/2005 | Eyuboglu et al. |
| 2005/0233749 A1 | 10/2005 | Karaoguz et al. |
| 2005/0238046 A1 | 10/2005 | Hassan et al. |
| 2005/0286466 A1 | 12/2005 | Tagg et al. |
| 2006/0025151 A1 | 2/2006 | Karaoguz et al. |
| 2006/0030356 A1* | 2/2006 | Haub ................. H04W 52/0245 |
| | | 455/553.1 |
| 2006/0058059 A1* | 3/2006 | Kim ...................... H04W 88/06 |
| | | 455/550.1 |
| 2007/0030824 A1 | 2/2007 | Ribaudo et al. |
| 2007/0032225 A1 | 2/2007 | Konicek et al. |
| 2007/0141988 A1 | 6/2007 | Kuehnel et al. |
| 2007/0266143 A1 | 11/2007 | Zeng et al. |
| 2007/0293197 A1* | 12/2007 | Ekberg .................. H04W 12/02 |
| | | 455/414.1 |
| 2008/0025330 A1 | 1/2008 | Wang |
| 2008/0031169 A1 | 2/2008 | Shi et al. |
| 2008/0032738 A1 | 2/2008 | Boyer et al. |
| 2008/0056215 A1 | 3/2008 | Kopikare et al. |
| 2008/0062945 A1 | 3/2008 | Ahuja et al. |
| 2008/0109302 A1 | 5/2008 | Salokannel et al. |
| 2008/0139239 A1 | 6/2008 | O'Connor |
| 2008/0146269 A1* | 6/2008 | Pirzada ................. H04B 1/005 |
| | | 455/552.1 |
| 2008/0240048 A1 | 10/2008 | Okker et al. |
| 2008/0291855 A1 | 11/2008 | Bata et al. |
| 2008/0298327 A1 | 12/2008 | Dawson et al. |
| 2008/0311896 A1 | 12/2008 | Karaoguz et al. |
| 2009/0046740 A1 | 2/2009 | Ruckart |
| 2009/0327713 A1 | 12/2009 | Marin et al. |
| 2010/0003990 A1 | 1/2010 | Suemitsu et al. |
| 2010/0177703 A1 | 7/2010 | daCosta et al. |
| 2013/0023238 A1* | 1/2013 | Kaplan ............. H04M 3/42042 |
| | | 455/411 |

\* cited by examiner

MESH NETWORK CONNECTIONS

CROSS-REFERENCE TO RELATED APPLICATIONS/INCORPORATIONS BY REFERENCE

This application is a continuation of U.S. patent application Ser. No. 13/625,322, entitled "Method and System for Dynamically Setting Up and Tearing Down Connections in Mesh Networks," filed on Sep. 24, 2012, now issued as U.S. Pat. No. 9,237,600, which is a continuation of U.S. patent application Ser. No. 11/864,339, entitled "Method and System for Dynamically Setting Up and Tearing Down Connections in Mesh Networks," filed Sep. 28, 2007, now issued as U.S. Pat. No. 8,274,957, which makes reference to, claims priority to and claims benefit from U.S. Provisional Application Ser. No. 60/950,959 filed on Jul. 20, 2007, all of which are hereby incorporated by reference in their entireties. The above stated applications are hereby incorporated herein by reference in their entireties.

FIELD OF THE INVENTION

Certain embodiments of the invention relate to wireless devices. More specifically, certain embodiments of the invention relate to a method and system for dynamically setting up and tearing down connections in mesh networks.

BACKGROUND OF THE INVENTION

The field of wireless communication has seen dramatic growth the last few years. In today's world, most people use their wireless devices for various purposes, business and personal, on a constant and daily basis. Society is truly becoming a wireless one. Numerous wireless solutions have been introduced, and have made a tremendous impact on everyday life.

For example, the use of Wireless Personal Area Networks (WPAN) has been gaining popularity in a great number of applications because of the flexibility and convenience in connectivity they provide. WPAN systems generally replace cumbersome cabling and/or wiring used to connect peripheral devices and/or mobile terminals by providing short distance wireless links that allow connectivity within very narrow spatial limits (typically, a 10-meter range). WPAN may be based on standardized technologies, for example Class 2 Bluetooth® (BT) technology. While WPAN may be very beneficial for certain applications, other applications may require larger service areas and/or capabilities.

To satisfy such needs, other technologies have been developed to provide greater wireless service. Wireless Local Area Networks (WLAN) systems may operate within a 100-meter range, for example. In contrast to the WPAN systems, WLAN provide connectivity to devices that are located within a slightly larger geographical area, such as the area covered by a building or a campus, for example. WLAN systems are generally based on specific standards, for example IEEE 802.11 standard specifications, and typically operate within a 100-meter range, and are generally utilized to supplement the communication capacity provided by traditional wired Local Area Networks (LANs) installed in the same geographic area as the WLAN system.

Other forms of wireless solutions have evolved from traditional land-based communication technologies. For instance, cellular phones have become just about an absolute necessity in today's world. While cellular technology was merely intended to add an element of mobility to the traditional telephony service, this technology has grown beyond that initial purpose. Many modern cellular technologies, including such technologies as GSM/GPRS/EDGE, UMTS, and CDMA2000, incorporate substantial data capabilities. Most of today's cellular services include such features as text messaging, video streaming, web browsing . . . etc.

Combining various wireless technologies is another trend in the wireless world. For instance, WLAN systems may be operated in conjunction with WPAN systems to provide users with an enhanced overall functionality. For example, Bluetooth® technology may be utilized to connect a laptop computer or a handheld wireless terminal to a peripheral device, such as a keyboard, mouse, headphone, and/or printer, while the laptop computer or the handheld wireless terminal is also connected to a campus-wide WLAN network through an access point (AP) located within the building.

Devices aimed at taking advantage of the capabilities of wireless networks can be described as Wireless mobile communication (WMC) devices. Today's WMC devices may comprise such devices as cellular phones, PDA's, laptops, and/or other devices.

One of the issues that arise with the use of WMC devices is the availability of wireless connectivity. Because WMC devices are typically aimed at use-on-the-move, a WMC device, due to its user's movement, may be located outside the wireless connectivity coverage area. For example, with such devices as mobile phones, it is not unusual for a user to drive out of a cellular network coverage area, especially when driving between towns. This may result in dropped calls or significantly degraded reception and/or services.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for dynamically setting up and tearing down connections in mesh networks, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for dynamically setting up and tearing down connections in mesh networks. WMC devices may be enabled to communicate directly with other WMC devices that may be located within proximity of each other, thereby allowing peer-to-peer connectivity. WMC devices' peer-to-peer communication may be device-specific and thus limited to a class of devices based on type and/or make. Alternatively, a WMC devices' peer-to-peer connectivity may also be based on a standardized wireless connectivity interface, for example Bluetooth®. Such WMC devices peer-to-peer connectivity may be utilized to form a mesh (ad hoc wireless) network, in which the WMC devices may form intra-mesh (device-to-device) connections. The intra-mesh connections may comprise one of various available wireless technologies, including, but mot limited to Bluetooth®, WiFi, and Cellular. Determining the type of wireless technology utilized in forming the intra-mesh connection may depend on various reasons, including relative location, velocity, and/or direction of movement of two WMC devices attempting to form the intra-mesh connection. For example, due to the limited range of Bluetooth® connections, two WMC devices moving away at 20 MPH may not utilize Bluetooth® connection because they may quickly move out of operating range. Additionally, WMC devices in mesh networks may advertise available services to other devices. Knowledge about other devices available services may be utilized in determining the type of wireless technology to be utilized in forming intra-mesh connections. For example, where a device advertises availability of data forwarding and another device attempts to utilize that service, a wireless technology that provides improved QoS and/or bandwidth may be utilized instead of other technology that may require less resources but may not be provide sufficient QoS and/or bandwidth.

Figure 1A:
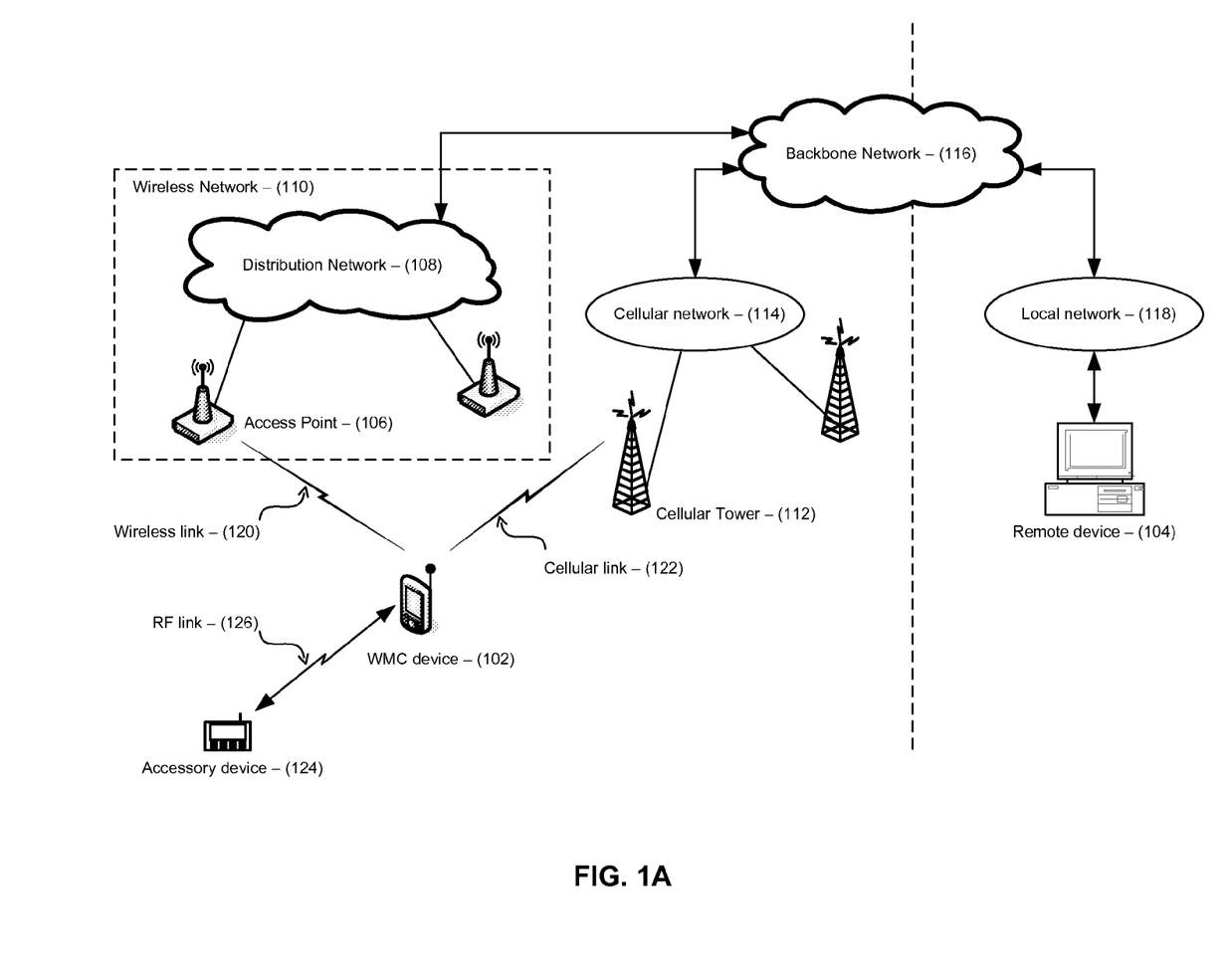
FIG. 1A is a block diagram that illustrates an exemplary model for setup that comprises a wireless mobile communication (WMC) device and a remote device, which may be utilized in accordance with an embodiment of the invention.

FIG. 1A is a block diagram that illustrates an exemplary model for setup that comprises a wireless mobile communication (WMC) device and a remote device, which may be utilized in accordance with an embodiment of the invention. Referring to FIG. 1A, there is shown a WMC device 102, a remote device 104, an access point 106, a distribution network 108, a wireless network 110, a cellular tower 112, a cellular network 114, a backbone network 116, a local network 118, a wireless link 120, a cellular link 122, an accessory device 124, and a RF link 126.

The WMC device 102 may comprise suitable logic, circuitry and/or code that may enable performing wireless mobile communication. For example, the WMC device 102 may be utilized to perform voice, video and/or text message peer-to-peer communication. A WMC device may comprise an end user device or an end user terminal device comprising a user interface. The WMC device 102 may also perform additional functionality comprising internet browsing, and/or video streaming. The remote device 104 may comprise suitable logic, circuitry and/or code that may be enabled to communicate to with the WMC device 102. The invention may not be limited to a specific remote device, but may comprise, for example, a general purpose processing device, a specialized processing device, a specialized peripheral device, or any combination of suitable hardware, and/or code, which may be enabled to perform a job requested by the WMC device 102. For example, the remote device may comprise a home PC comprising fast processing subsystems and increased memory space. Such home PC may be better suited to perform processing and/or storage intensive tasks. For example, where necessary and/or feasible, the WMC device 102 may utilize the remote device 104 for Internet searches and/or for secure storage of data that may be created and/or maintained in the WMC device 102.

The wireless network 110 may comprise a plurality of the access point 106, the distribution network 108, and suitable logic, circuitry and/or code that may enable implementing a functional block corresponding to a wireless technology. Exemplary wireless technology may comprise for example the IEEE 802.11 (WLAN) or WiMAX (IEEE 802.16) architecture. The access point 106 may comprise suitable hardware, logic, circuitry, and/or code that may be utilized as access point necessary for the WMC device 102 to access the wireless network 110. The distribution network 108 may comprise suitable hardware, logic, circuitry, and/or code that may be adapted to operate as a backbone network that may be responsible for transport and link functionality for plurality of access points in the wireless network 110.

The cellular network 114 may comprise plurality of the cellular tower 112, and suitable logic, circuitry and/or code that may enable implementing a functional block corresponding to a cellular technology. Exemplary cellular technology may comprise cellular technologies that enable data services, including but not limited to, CDMA, WCDMA, CDMA1000, HSDPA, GSM, GPRS, EDGE, and UMTS.

The accessory device 124 may comprise suitable logic, circuitry and/or code that may enable performing some accessory functionality in conjunction with the use of the WMC device 102. For example, the accessory device may comprise a hands-free headset. The WMC device 102 may interact with the accessory device 124 over a short-range RF link 126. The RF link 126 may be based on a standardized technology for inter-device short range communication. For example, the RF link may correspond to a Bluetooth® connection or ZigBee connection between the accessory device 124 and the WMC device 102.

The local network 118 may comprise suitable logic, circuitry and/or code that may enable local connectivity. This local connectivity may comprise use of Local Area Network (LAN) technologies that enable data services, including but not limited to, IEEE 802.3 Ethernet. Other technologies may comprise WiMAX.

The backbone network 116 may comprise suitable hardware, logic, circuitry, and/or code that may be adapted to provide overall system connectivity between sub-networks. The wired network 116 may be enabled to interact with, and connect different wired and/or wireless technologies. For example, the backbone network may comprise a standard telephony network (POTS) that may enable data connectivity between different interface nodes linking wired and/or wireless networks comprising WLAN networks, WiMAX networks, cellular networks, and/or LAN networks.

In operation, the WMC device 102 may utilize the wireless link 120 to access the wireless network 110 via the access point 106. The WMC device 102 may also utilize the cellular link 122 to access the cellular network 114 via the cellular tower 112. The WMC device 102 may attempt to communicate with the remote device 104 via the wireless network 110 through the access point 106 and the distribution network 108. The distribution network 108 may enable forwarding messaging and/or data sent from, and to the WMC device 102. The backbone network 116 enables connectivity between local networks, for example wireless network 110, and cellular network 114. The remote device 104 may receive communication from the WMC device 102 by interacting with the backbone network 116. Necessary protocol-based operations may be performed to facilitate the transmission of information through all the different components. This may comprise use of such protocols as IP, SS7 . . . etc.

Figure 1B:
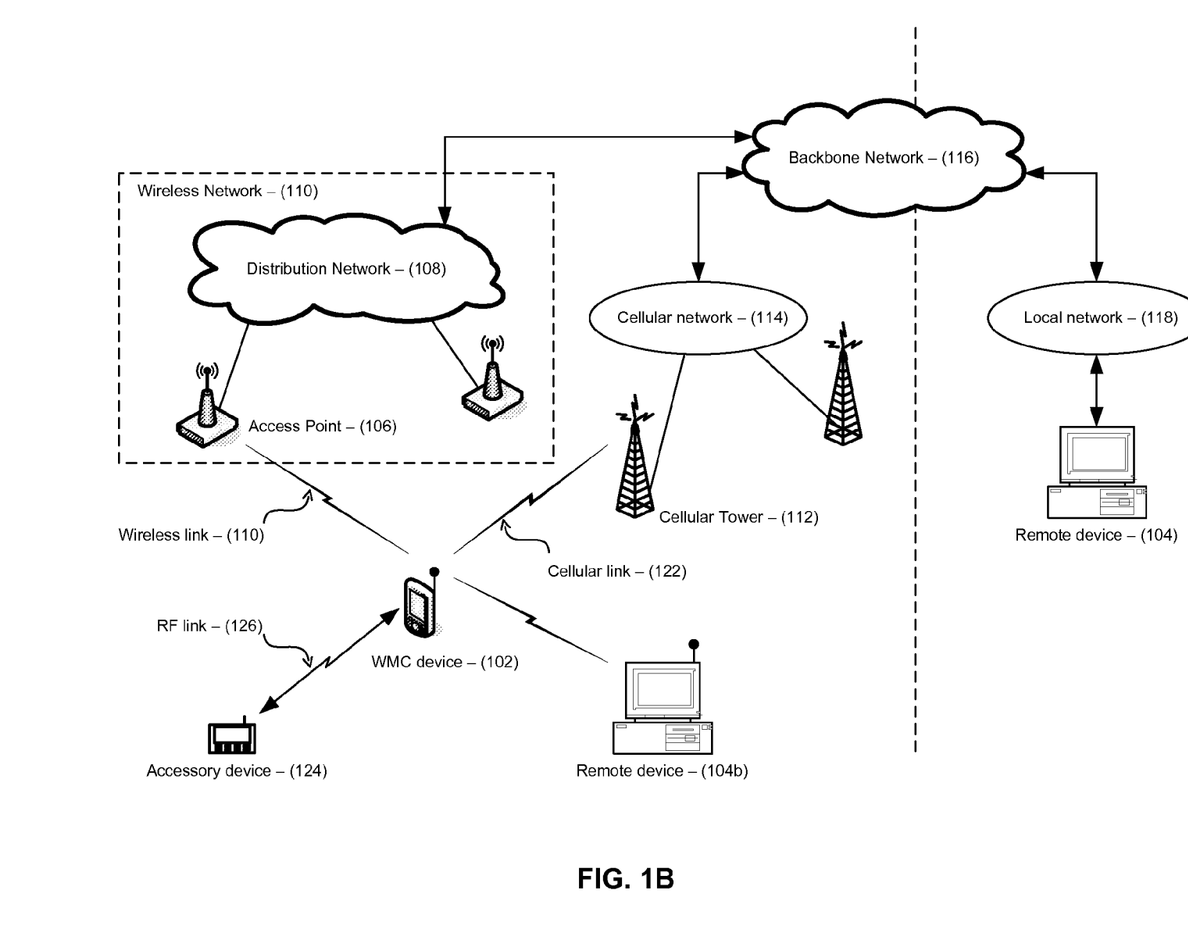
FIG. 1B is a block diagram that illustrates an exemplary model for setup that comprises a wireless mobile communication (WMC) device communicating directly via a wireless connection with a remote device, which may be utilized in accordance with an embodiment of the invention.

FIG. 1B is a block diagram that illustrates an exemplary model for setup that comprises a wireless mobile communication (WMC) device communicating directly via a wireless connection with a remote device, which may be utilized in accordance with an embodiment of the invention. Referring to FIG. 1B, there is shown the WMC device 102, the remote device 104, the access point 106, the distribution network 108, the wireless network 110, the cellular tower 112, the cellular network 114, the backbone network 116, the wireless link 120, the cellular link 122, the accessory device 124, the RF link 126, and a remote device 104b.

The remote device 104b may be similar to the remote device 104. However, the remote device 104b may also comprise suitable hardware, logic, circuitry, and/or code that may enable wireless connectivity.

In operation, the WMC device 102, the remote device 104, the access point 106, the distribution network 108, the wireless network 110, the cellular tower 112, the cellular network 114, the backbone network 116, the wireless link 120, the cellular link 122, the accessory device 124, and the RF link 126 may operate similar FIG. 1A. The remote device 104b may operate similar to the remote device 104. However, the WMC device 102 may communicate directly with the remote device 104b over a wireless connection. The remote device 104b may be operated as a stand-alone device, or it may be operated within a compatible network, wherein the remote device may be integrated. The ability to communicate directly with the remote device 104b may allow improved utilization of the remote device 104b by the WMC device 102. The direct wireless connection between the WMC device 102 and the remote device 104b may enable faster and more reliable communication between the two devices. The improvement may be due to the characteristics of the wireless connection between the remote device 104b and the WMC device 102, for example having greater bandwidth. The improvement may also be due to reduced delays compared to setups where the WMC device may have to communicate with the remote device 104 through plurality of connecting networks and/or entities.

Figure 2:
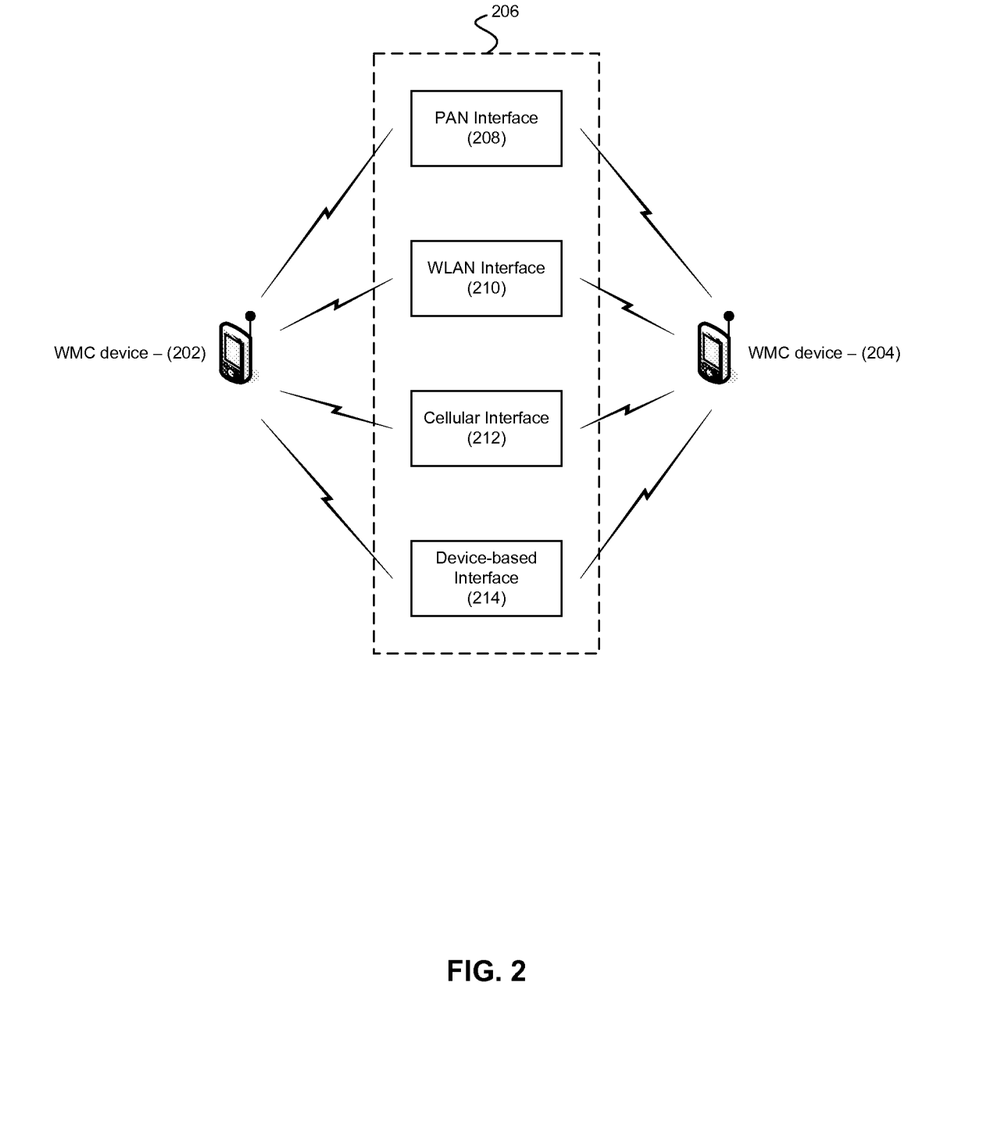
FIG. 2 is a block diagram that illustrates an exemplary communication setup between two wireless mobile communication (WMC) devices, which may be utilized in accordance with an embodiment of the invention.

FIG. 2 is a block diagram that illustrates an exemplary communication setup between two wireless mobile communication (WMC) devices, which may be utilized in accordance with an embodiment of the invention. Referring to FIG. 2, there is shown a WMC device 202, a WMC device 204, a device-to-device connection 206, a personal area network (PAN) interface 208, a Wireless Local Area Network (WLAN) interface 210, a Cellular interface 212, and a device-based interface 214. The PAN interface may comprise a ZigBee and/or a Bluetooth® (BT) interface.

The WMC devices 202 and 204 may be substantially similar to the WMC device 102, and may also comprise suitable logic, circuitry and/or code that enable device-to-device communication. The device-to-device connection 206 may comprise wireless connectivity that enables direct communications between WMC devices 202 and 204. The device-to-device connection 206 may utilize a wireless interface. The invention may not be limited to a specific type of wireless interface, but may comprise for example, the PAN interface 208, the Wireless Local Area Network (WLAN) interface 210, the Cellular interface 212, and/or the device-based interface 214.

The PAN interface 208 may comprise suitable functionality that enables forming connections based on the Bluetooth® standard (IEEE 802.15) or ZigBee. The Wireless Local Area Network (WLAN) interface 210 may comprise suitable functionality that enables forming connections based on the WLAN standard (IEEE 802.11). The Cellular interface 212 may comprise suitable functionality that enables forming connections based on a cellular standard; for example, GSM/GPRS/EDGE, CDMA, CDMA2000 . . . etc. The device-based interface 214 may comprise suitable functionality that enables forming connections between specific WMC devices. For example, a manufacturer of a type of WMC devices may utilize a proprietary standard of wireless communication between WMC devices of that type.

In operation, the WMC devices 202 and 204 may communicate directly when they are in near proximity of each other. The WMC devices 202 and 204 may form the device-to-device connection 206. The device-to-device connection 206 may be formed via the PAN interface 208, the WLAN interface 210, the Cellular interface 212, and/or the device-to-device interface 214. The choice of the wireless interface may be based on suitability of the interface based on variety of factors related to the WMC devices 202 and 204. For example, spatial considerations, including but not limited to relative speeds, locations, and/or direction of movements of the WMC devices 202 and 204, may be utilized to determine a suitable wireless interface based on range limitations for instance. Also, power consumption requirements and/or data bandwidths may be utilized to determine a suitable wireless interfaces.

Spatial considerations may be utilized in forming and/or tearing down device-to-device connection 206 because different wireless interfaces that may be utilized in establishing such connections may have varying operational ranges. For example, in instances where the WMC devices 202 and 204 may be located within few meters of each other, the PAN Interface 208 based connection may be utilized to form the device-to-device connection 206. However, in instances where the WMC devices may be located far apart, for example more then 100 meters, the PAN interface 208 based connection may not be available, and other wireless interfaces with greater operations ranges, for example WLAN interface 210, may be utilized. Also, even in instances where the WMC devices 202 and 204 may be initially located within the operational range of a PAN interface 208 based connection, the WMC devices 202 and 204 may not utilize a PAN interface connection because of the devices' movements. If the WMC devices 202 and 204 were moving in different directions at high speeds, for example moving in opposite directions at 20 MPH, the WMC devices 202 and 204 may determine that they may move out of the operational range of a PAN interface 208 based connection too quickly. The WMC devices 202 and 204 may choose another wireless interface, for example WLAN interface 210, which may offer greater operational range, and thus longer duration of communication as the WMC devices 202 and 204 move apart.

Data bandwidths may also be relevant in forming and/or tearing down device-to-device connection 206 because different wireless interfaces that may be utilized in establishing such connections may offer varying data bandwidths. For example, where the WMC devices 202 and 204 may be located within few meters of each other, the PAN Interface 208 based connection may be sufficient to form the device-to-device connection 206 when the WMC devices 202 and 204 may only be communicating to receive and transmit updates from the rest of the mesh network 304, for example advertised available services. However, where the WMC devices 202 and 204 may be communicating large data files, the PAN interface 208 based connection may not be sufficient, and other wireless technologies with greater data bandwidths, for example WLAN interface 210, may be utilized instead.

Power consumption may also be relevant in forming and/or tearing down device-to-device connection 206 because different wireless interfaces that may be utilized in establishing such connections may have different power requirements. Power may be a limitation in WMC devices due to such factors as the characteristics of the batteries that may be used in such devices. The WMC devices 202 and 204 may choose wireless interfaces that has lower power requirement in order to prolong battery life. For example, where the WMC devices 202 and 204 may be located within few meters of each other, PAN Interface 208 based connection may be more desirable than another wireless interface with higher power requirement, for example WLAN interface 210. The WMC devices 202 and 204 may also tear down existing device-to-device connection 206 where the power cost of retaining such connection may be deemed unacceptable as the power supply in at least one of the WMC devices 202 and 204 may be decreasing.

In an embodiment of the invention, in addition to use of performance-based factors, other factors, such as cost, may be utilized when forming and/or tearing down devices-to-devices connection 206. WMC devices in a mesh network may advertise services based on a cost function, wherein such WMC device may avail certain services in exchanged for deferent cost values. These Cost values may comprise monetary compensation, for example, per-minute charge similar to what a wireless provider may require, or it may comprise a trade-off of services required in return. For example, the WMC device 204 may advertise availability of the PAN interface 208 and the WLAN interface 210 at different costs. Consequently, the WMC device 204 may only be able to utilize the WLAN interface 210 when forming device-to-device connection 206 with WMC device 202 when requested cost of the WLAN interface 210 may be satisfied.

Figure 3A:
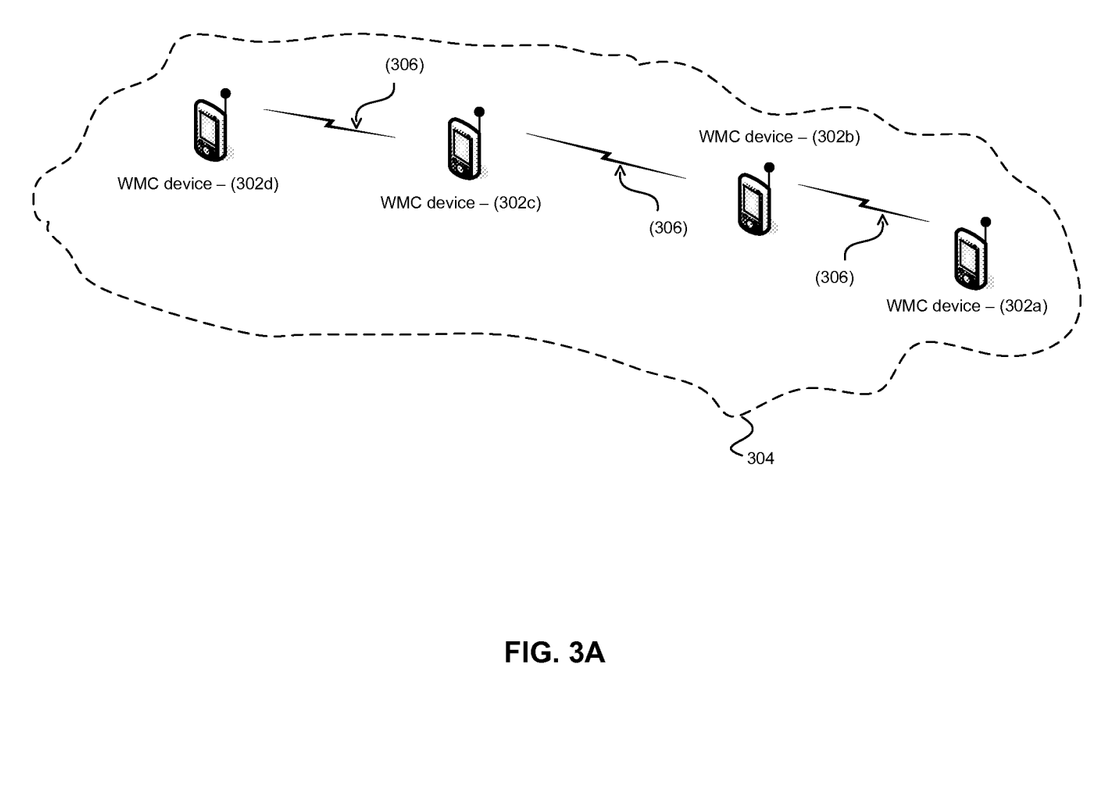
FIG. 3A is a block diagram that illustrates a plurality of WMC devices forming a mesh network, which may be utilized in accordance with an embodiment of the invention.

FIG. 3A is a block diagram that illustrates a plurality of WMC devices forming a mesh network, which may be utilized in accordance with an embodiment of the invention. Referring to FIG. 3A, there is shown a WMC mesh network 304, a plurality of WMC devices 302a, 302b, 302c, and 302d, and an intra-mesh connection 306.

The plurality of WMC devices 302a, 302b, 302c, and 302d may be substantially similar to the WMC devices 202 and 204. The WMC mesh network 304 may comprise a plurality of WMC devices, and may also comprise suitable logic, circuitry and/or code that may enable forming mesh-like, ad hoc wireless networks of WMC devices. The intra-mesh connection 306 may comprise a device-to-device connection substantially similar to the device-to-device connection 206 as described in FIG. 2.

In operation, a plurality of WMC devices 302a, 302b, 302c, and 302d may communicate with each other once the devices are within device-to-device communication range. Each device may utilize the intra-mesh connection 306 to communicate with other device(s) in the mesh network 304. The WMC devices in the mesh network 304 may utilize plurality of the intra-mesh connection 306 in order to enable utilizing the other WMC devices in the mesh network 304 for certain operations including, for example, forwarding data and/or messages. The formation of the intra-mesh connections may be dynamic and the WMC devices in the mesh network 304 may tear down existing intra-mesh connections and/or form new intra-mesh connections where such formation and/or tearing down of intra-mesh connections may be necessary. The forming and/or tearing down of intra-mesh connections may be based on spatial considerations that may include such spatial factors as relative speeds, locations, and/or directions of movement of the WMC devices forming and/or attempting to form intra-mesh connections.

For example, two WMC devices may be communicating via an intra-mesh connection that utilizes Bluetooth® interface. If the two devices started to move away from each other at speeds of 20 MPH, the devices will quickly become outside of typical Bluetooth® coverage range (typically ~1-100 meters based on the class). Therefore, the WMC devices may tear down the current intra-mesh connection and attempt to form a new intra-mesh connection that may utilize a wireless interface with longer communication range, such as WiMAX (IEEE 802.16) for instance.

In instances when the WMC devices may be sufficiently near in proximity, a plurality of wireless interfaces may be available; and other considerations such as power consumption and/or available services advertised by other WMC devices in the mesh network may be utilized in determining the type of interface to be used in forming the intra-mesh connection 306. For example, two WMC devices in the mesh network 304 may form an intra-mesh connection that utilizes Bluetooth® interface because Bluetooth® connections generally have low power requirements. Also, two WMC devices in the mesh network 304 may form an intra-mesh connection that may utilize a wireless interface that may enable large data bandwidth rather then more power efficient interface where one of the WMC devices advertise available services such as the ability to forward data and/or message to external networks, and the other WMC device may desire to utilize the advertised service. The available services may also comprise data buffering and/or storing wherein another WMC device in the mesh network 304 may be better suited for storage and/or buffering for data. This may be due to such factors as higher storage/buffering capacity, lower load, and/or proximity to potential external and/or internal targets and/or sources of communicated data.

While the diagram represents all connections between the WMC devices in the mesh network 304 in a similar fashion, the intra-mesh connections 306 need not be of the same type at any given point in the mesh network 304. For example, the WMC devices 302d and 302c may utilize a PAN interface 208 based intra-mesh connection such as a Bluetooth® and/or ZigBee connection where the devices are sufficiently with in operational proximity of each other. At the same time, the WMC devices 302c and 302b may utilize another type of wireless technology in forming the intra-mesh connection 306 between these devices because they are not sufficiently within operational proximity necessary for the PAN interface 208 and/or because they may require higher data rates than available. For example, the WMC devices 302c and 302b may utilize WiMAX and/or WLAN connection.

Also, while the diagram represents all connections between the WMC devices in the mesh network 304 as a single connection between each pair of WMC devices, a pair of WMC devices in the mesh network 304 may utilize multiple connections at the same time. For example, the WMC devices 302d and 302c may form two intra-mesh connections at the same time. One intra-mesh connection may be based on PAN interface 208 connection such as Bluetooth® connection, which may be desired, due to such factors as low power consumptions for instance, in situations where the devices may not need high data rates. The second connection between the WMC devices 302c and 302d may utilize a wireless technology that may enable higher data rates than PAN interface connection, for example a WiMAX connection. The second connection may be utilized for communication between the WMC devices 302c and 302d that require higher bandwidth while the first connection may be utilized at the same time for other communication that may not need high data bandwidth.

Figure 3B:
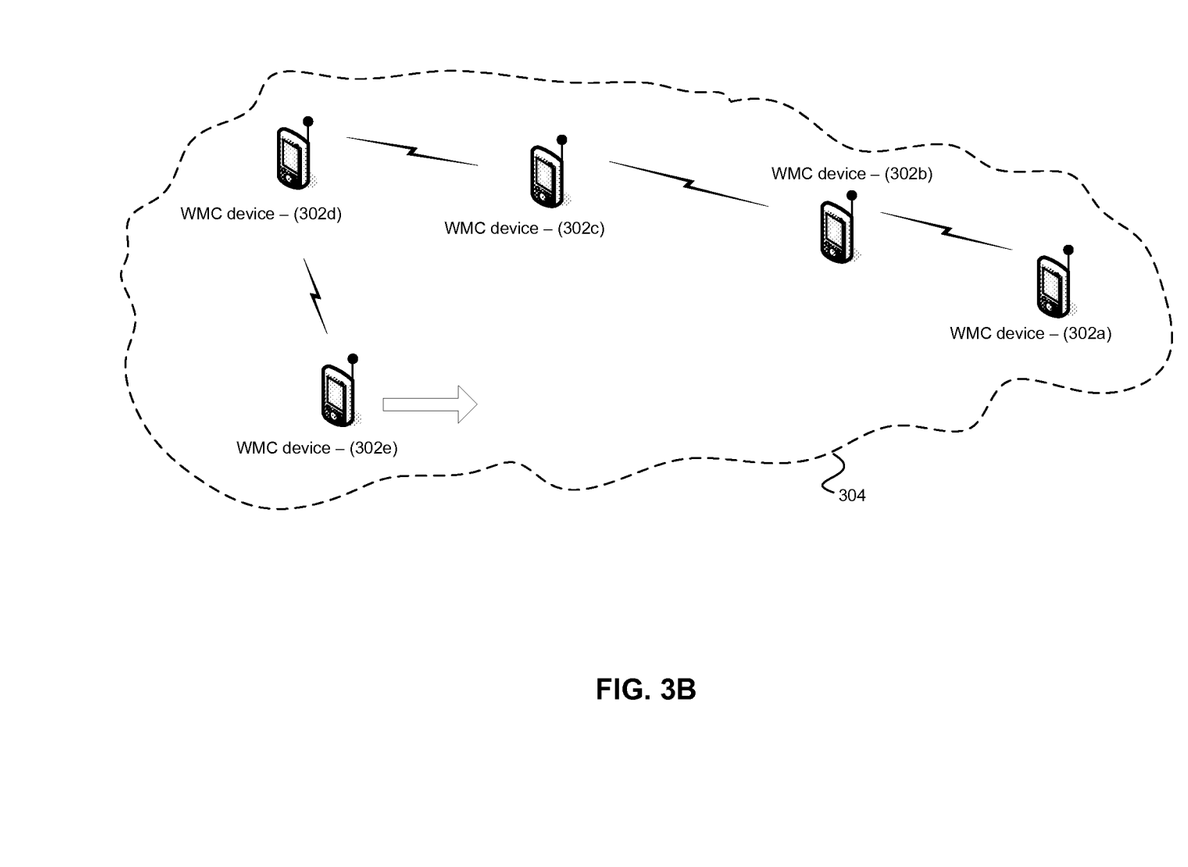
FIG. 3B is a block diagram that illustrates a plurality of WMC devices forming a mesh network with a new WMC device joining the mesh network and forming a new intra-mesh connection, which may be utilized in accordance with an embodiment of the invention.

FIG. 3B is a block diagram that illustrates plurality of WMC devices forming a mesh network with a new WMC device joining the mesh network and forming a new intra-mesh connection, which may be utilized in accordance with an embodiment of the invention. Referring to FIG. 3B, there is shown the WMC mesh network 304, and the plurality of the WMC devices 302a, 302b, 302c, 302d, and a WMC device 302e.

The WMC device 302e may be substantially similar to the WMC devices 302a, 302b, 302c, and 302d.

In operation, the plurality of WMC devices 302a, 302b, 302c, and 302d may communicate with each other once the devices are within device-to-device communication range and for the mesh network 304 substantially as described in FIG. 3A. The WMC device 302e may sufficiently move within the range of the mesh network 304. The WMC device 302e may join the mesh network 304 and form intra-mesh connections with WMC devices in the mesh network 304. For example, the WMC device 302e may form an intra-mesh connection with the WMC device 302d because the WMC device 302d may be the closest device to the WMC device 302e at that point, and therefore, the WMC device 302e may be joined to the mesh network 304 utilizing low power consumption. Because power may be a limitation in WMC devices, power consumption may be an important factor in determining the type of wireless technology that may be utilized in forming intra-mesh connections. Such power consideration may be taken into account, for example, in instances where the WMC device 302e may only be maintaining intra-mesh connection for the purposes of receiving and transmitting updates from the rest of the mesh network 304, for example advertised available services. In such scenarios, it may suffice, where the WMC device 302e may be sufficiently close to the WMC device 302d, to allow utilizing PAN interface 208 in forming the intra-mesh connection between the two devices. However, the WMC device 302e may not be sufficiently close to the WMC device 302d to allow utilizing PAN interface 208, or one or both device may desire communicating higher data rates than may be available in a PAN interface 208 based connection. In these scenarios, and where the WMC devices 302e and 302d may evaluate power availability and/or requirement to determine whether they may be enable to form a new intra-mesh connection that utilizes another wireless technology that may enable communication over greater range and/or higher data rates, for example WiMAX and/or WLAN.

Figure 3C:
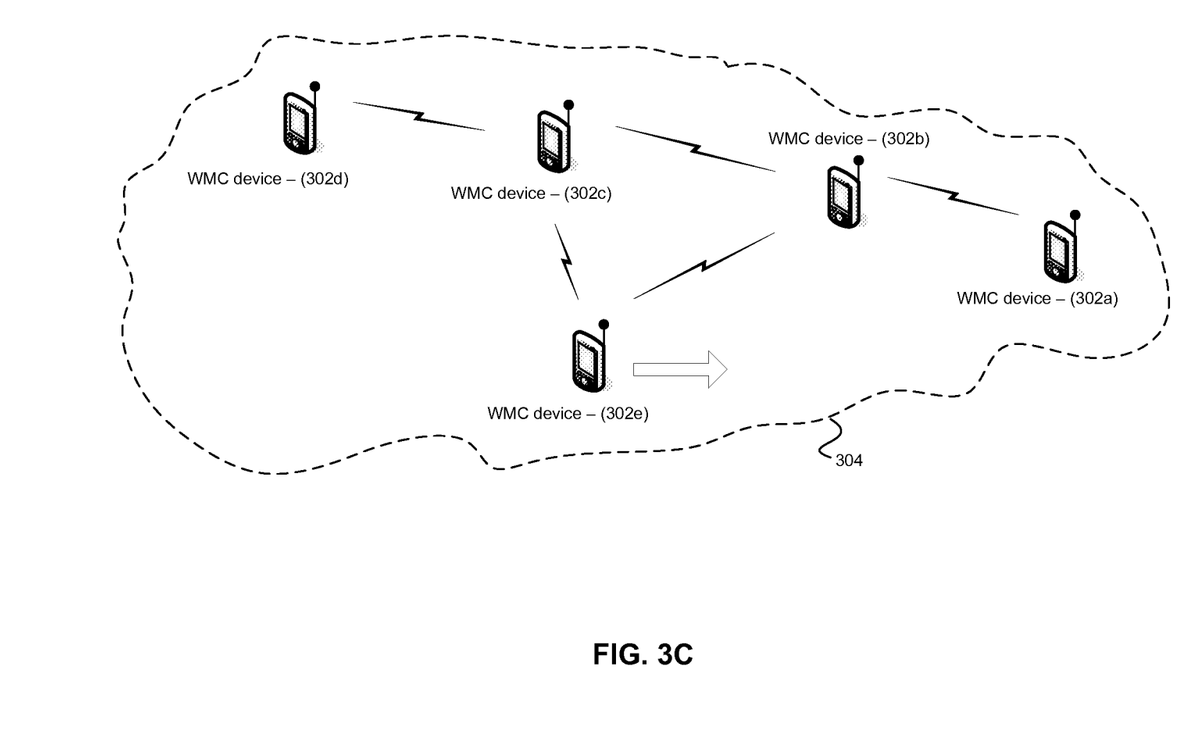
FIG. 3C is a block diagram that illustrates a plurality of WMC devices forming a mesh network with a WMC device moving through the mesh network and forming a new intra-mesh connection, which may be utilized in accordance with an embodiment of the invention.

FIG. 3C is a block diagram that illustrates a plurality of WMC devices forming a mesh network with a WMC device moving through the mesh network and forming a new intra-mesh connection, which may be utilized in accordance with an embodiment of the invention. Referring to FIG. 3C, there is shown the WMC mesh network 304, and the plurality of the WMC devices 302a, 302b, 302c, 302d, and the WMC device 302e.

In operation, the WMC device 302e may move within the mesh network 304 relative to other devices in the network. Due to its movement, the WMC device 302e may tear down its intra-mesh connection with the WMC device 302d, and form a new intra-mesh connection with the WMC device 302c because the WMC device 302c is now closer to the WMC device 302e than the WMC device 302d, and therefore less power consumption may be necessary to maintain an intra-mesh connection of the same type. Also, the WMC device 302e may form a secondary intra-mesh connection with THE WMC device 302b. This connection may be formed because WMC device 302b may be advertising an available service that WMC device 302e may desire to use. For example, the WMC device 302b may advertise that it may have the ability to forward data and/or messages to external networks. The WMC device 302e may utilize the intra-mesh connection with the WMC device 302b to access the remote device 104 via the external connectivity service of the WMC device 302b.

Figure 4:
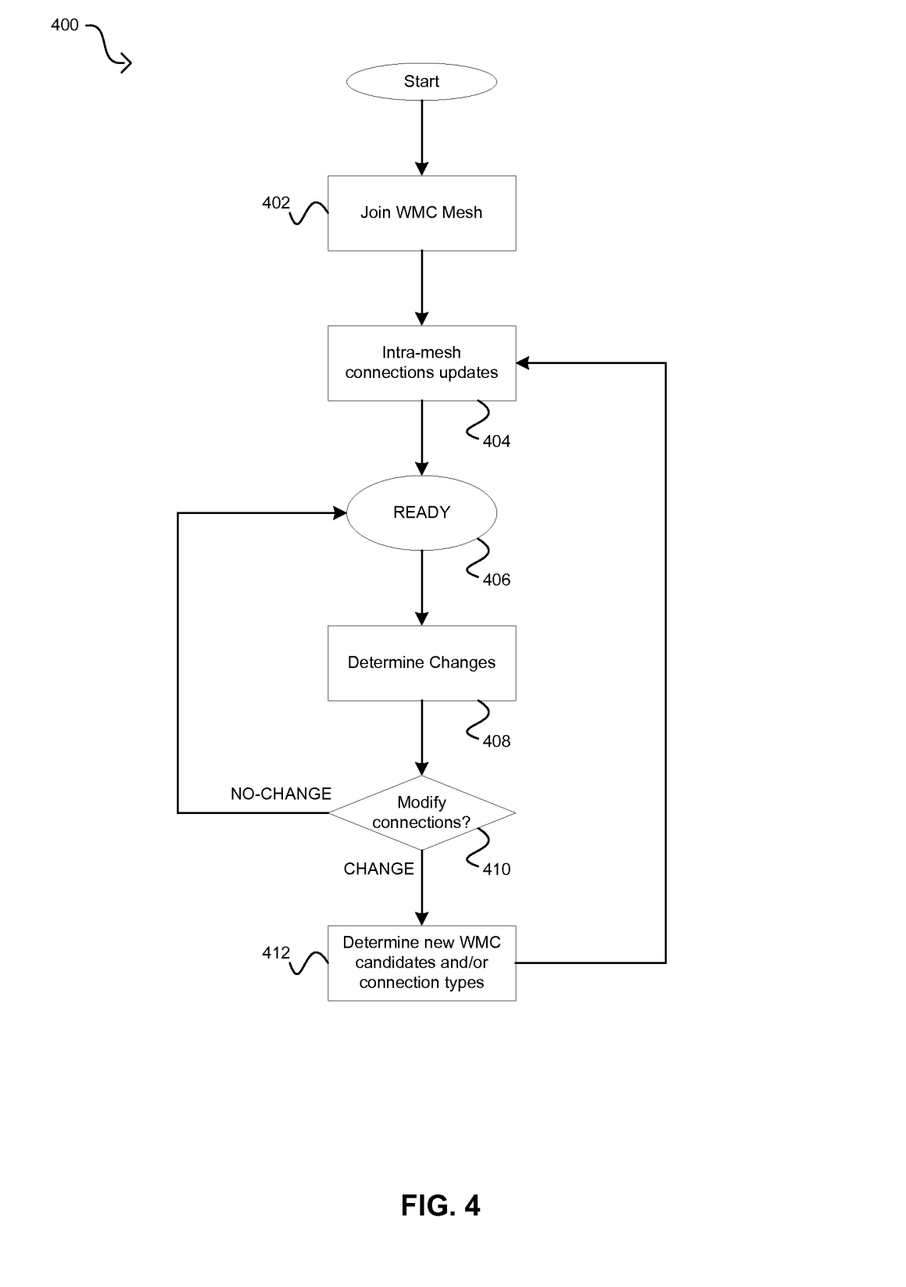
FIG. 4 is a flow chart that illustrates a WMC device joining mesh network and forming and/or tearing down intra-mesh connections, which may be utilized in accordance with an embodiment of the invention.

FIG. 4 is a flow chart that illustrates a WMC device joining mesh network and forming and/or tearing down intra-mesh connections, which may be utilized in accordance with an embodiment of the invention. Referring to FIG. 4, there is shown flow chart 400. The flow chart may start when a WMC device comes into near proximity of other WMC devices forming a mesh network, substantially similar to the mesh described in FIG. 3A. In step 402, the WMC device may join the mesh network. The WMC device may utilize device-to-device connections to interact with other WMC devices forming the mesh network substantially similar to the device-to-device connection 206 as described in FIG. 2 in order to determine the other WMC devices spatial information and/or advertised available services. For example, the WMC device may utilize Bluetooth® interface in peer-to-peer communications with nearby WMC devices in the mesh device 304. In step 404, the WMC device may form intra-mesh connections with other WMC devices in the mesh network 304. The WMC device may form dedicated device-to-device connections with other WMC devices in the mesh network 304. In step 406, the WMC device is READY, wherein the WMC device is actively participating in the WMC mesh operations and may be capable of tracking spatial information of other WMC devices in the mesh network 304, and may be capable of receiving from and/or advertising to other WMC devices available services.

In step 408, the WMC device may determine that there were changes regarding other WMC devices in the mesh network 304. This may comprise spatial changes that may be due relative speeds, locations, and/or directions of movement of WMC devices in the mesh network 304. Other changes may be determined based on newly advertised available services by other WMC devices in the mesh network 304 and/or new requests for utilizing available services advertised by the WMC device. In step 410, the WMC device determines whether there is a need to modify the intra-mesh connection it currently has. In the instance that the outcome of the determination in step 410 was NO-CHANGE, the WMC device need not modify its current intra-mesh connections, and the process may return to step 406.

Returning to step 410, in the instance that the outcome of the determination in step 410 was CHANGE, the WMC device may need to modify its current intra-mesh connections. In this regard, the WMC device may tear down some of its current intra-mesh connections and/or form new intra-mesh connections in order to account for spatial changes relative to other WMC devices in the mesh network 304, to obtain some newly advertised available services by other devices in the mesh network 304, and/or to provide for new requests regarding available services previously advertised by the WMC device. The process may proceed back to step 404 to perform the necessary intra-mesh connections updates before returning to READY state in step 406.

Various embodiments of the invention may comprise a method and system for dynamically setting up and tearing down connections in mesh networks. WMC devices 302a, 302b, 302c, 302d, and 302e may be enabled to communicate directly with each other when they may be located in near proximity of each other to form mesh network 304. In such mesh networks, the WMC devices may form intra-mesh (device-to-device) connections. The intra-mesh connections 306 may comprise one of various available standardized wireless connectivity interfaces, for example Bluetooth®, WLAN, and/or Cellular. The intra-mesh connections 306 may comprise device-specific interfaces, and thus be limited to a narrow class of devices based on type and/or make. Determining the type of wireless interface utilized in forming the intra-mesh connection in the mesh network 304 may depend on various reasons, including spatial factors that may comprise relative location, velocity, and/or direction of movement of two WMC devices attempting to form the intra-mesh connection. Additionally, WMC devices in the mesh network 304 may advertise available services to other devices. Knowledge about other devices available services may be utilized in determining the type of wireless interface to be utilized in forming intra-mesh connections 306. For example, where a device advertise availability of data forwarding and another device attempts to utilize that service, a wireless technology that provides improved QOS and/or bandwidth may be utilized instead of other technology that may require less resources but may not be provide sufficient QoS and/or bandwidth.

Another embodiment of the invention may provide a machine-readable storage, having stored thereon, a computer program having at least one code section executable by a machine, thereby causing the machine to perform the steps as described herein for dynamically setting up and tearing down connections in mesh networks.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A device comprising:
   a memory; and
   at least one processor circuit configured to:
   establish a first intra-mesh connection with another device of a mesh network using a first communication interface of a plurality of communication interfaces;
   identify a change in at least one operational condition;
   select a second communication interface of the plurality of communication interfaces based at least in part on the change in the at least one operational condition; and
   modify the first intra-mesh connection with the another device from using the first communication interface of the plurality of communication interfaces to using the second communication interface of the plurality of communication interfaces responsive to identifying the change in the at least one operational condition.

2. The device of claim 1, wherein the change in the at least one operational condition comprises a change in at least one of a power availability of the device, a location of the device, a speed of the device, or a direction of movement of the device.

3. The device of claim 1, wherein the at least one processor circuit is configured to modify the first intra-mesh connection with the another device from using the first communication interface of the plurality of communication interfaces to using the second communication interface of the plurality of communication interfaces by:
   tearing down the first intra-mesh connection with the another device using the first communication interface of the plurality of communication interfaces; and
   re-establishing the first intra-mesh connection with the another device using the second communication interface of the plurality of communication interfaces.

4. The device of claim 1, wherein the at least one processor circuit is further configured to:
   receive an advertisement of an available service transmitted by the another device; and select the first communication interface of the plurality of communication interfaces for establishing the first intra-mesh connection based at least in part on the available service advertised by the another device and an intended use of the available service by the device.

5. The device of claim 4, wherein the available service is independent of each of the plurality of communication interfaces.

6. The device of claim 4, wherein the at least one processor circuit is further configured to:
select the first communication interface of the plurality of communication interfaces for establishing the first intra-mesh connection based at least in part on at least one of a quality of service or a bandwidth associated with the available service advertised by the another device.

7. The device of claim 4, wherein the available service further comprises at least one of forwarding data in the mesh network by the another device on behalf of the device, or buffering data in the mesh network by the another device on behalf of the device.

8. The device claim 4, wherein the advertisement further comprises a cost for enabling a use of the available service by the another device and the first communication interface of the plurality of communication interfaces is selected for the first intra-mesh connection based at least in part on the cost.

9. The device of claim 4, wherein the at least one processor circuit is further configured to:
select the first communication interface of the plurality of communication interfaces for the first intra-mesh connection based at least in part on a data rate at which the device intends to utilize the available service advertised by the another device.

10. The device of claim 1, wherein the plurality of communication interfaces comprises at least one of a wireless personal area network interface, a wireless local area network interface, or a device-based interface.

11. A method comprising:
forming, by a first device, at least one intra-mesh connection with at least one second device of a plurality of devices of a mesh network;
receiving, by the first device, intra-mesh connections updates corresponding to one or more of the plurality of devices of the mesh network;
determining, by the first device, whether the intra-mesh connection updates necessitate a modification to the at least one intra-mesh connection; and
modifying, by the first device, the at least one intra-mesh connection with the at least one second device when the intra-mesh connection updates necessitate the modification to the at least one intra-mesh connection, otherwise maintaining the at least one intra-mesh connection.

12. The method of claim 11, further comprising:
forming, by the first device, the at least one intra-mesh connection by utilizing a first communication interface that is selected based at least in part on an available service advertised by the at least one second device of the plurality of devices and upon an intended use of the available service by the first device.

13. The method of claim 12, wherein the advertised available service is independent of the first communication interface.

14. The method of claim 11, wherein the at least one intra-mesh connection with the at least one second device utilizes a first communication interface of a plurality of communication interfaces, and modifying, by the first device, the at least one intra-mesh connection comprises:
modifying, by the first device, the at least one intra-mesh connection with the at least one second device from using the first communication interface the plurality of communication interfaces to using a second communication interface of the plurality of communication interfaces, the second communication interface being different than the first communication interface.

15. The method of claim 14, wherein modifying, by the first device, the at least one intra-mesh connection with the at least one second device from using the first communication interface the plurality of communication interfaces to using the second communication interface of the plurality of communication interfaces comprises:
tearing down the at least one intra-mesh connection with the second device using the first communication interface of the plurality of communication interfaces; and
establishing the at least one intra-mesh connection with the second device using the second communication interface of the plurality of communication interfaces.

16. The method of claim 15, wherein the plurality of communication interfaces comprises at least one of a wireless personal area network interface, a wireless local area network interface, or a device-based interface.

17. The method of claim 11, wherein the at least one intra-mesh connection with the at least one second device utilizes a first communication interface, and modifying, by the first device, the at least one intra-mesh connection comprises:
modifying, by the first device, the at least one intra-mesh connection from being through the at least one second device of the plurality of devices utilizing the first communication interface to being through at least one third device of the plurality of devices utilizing the first communication interface.

18. A computer program product comprising instructions stored in a non-transitory computer readable storage medium that when executed by a processor cause the processor to perform operations comprising:
establishing, by a first device, a first intra-mesh connection with a second device of a mesh network using a first communication interface of a plurality of communication interfaces;
identifying, by the first device, a change in at least one variable associated with the first device;
selecting, by the first device, a third device of the mesh network based at least in part on the change in the at least one variable associated with the first device; and
replacing, by the first device, the first intra-mesh connection with the first device using the first communication interface of the plurality of communication interfaces with a second intra-mesh connection with the third device using the first communication interface of the plurality of communication interfaces.

19. The computer program product of claim 18, wherein replacing, by the first device, the first intra-mesh connection with the second device using the first communication interface of the plurality of communication interfaces with the second intra-mesh connection with the third device using the first communication interface of the plurality of communication interfaces further comprises:
tearing down the first intra-mesh connection with the second device using the first communication interface of the plurality of communication interfaces; and instructions to establish the second intra-mesh connection with the third device using the first communication interface of the plurality of communication interfaces.

20. The computer program product of claim 18, wherein the plurality of communication interfaces comprises at least one of a wireless personal area network interface, a wireless local area network interface, or a device-based interface.

* * * * *